US005636134A

United States Patent [19]

Johnson et al.

[11] Patent Number: 5,636,134

[45] Date of Patent: *Jun. 3, 1997

[54] INTELLIGENT CIRCUIT BREAKER PROVIDING SYNCHRONOUS SWITCHING AND CONDITION MONITORING

[75] Inventors: David S. Johnson, Greensburg, Pa.; Aftab H. Khan, Raleigh, N.C.; Paul H. Stiller; Jeffry R. Meyer, both of Greensburg, Pa.

[73] Assignee: ABB Power T&D Company Inc., Raleigh, N.C.

[ * ] Notice: The term of this patent shall not extend beyond the expiration date of Pat. No. 5,629,869.

[21] Appl. No.: 451,996

[22] Filed: May 26, 1995

Related U.S. Application Data

[62] Division of Ser. No. 226,274, Apr. 11, 1994.

[51] Int. Cl.[6] .......... H02H 3/00

[52] U.S. Cl. .......... 364/492 B; 364/494; 364/550; 361/96; 200/281

[58] Field of Search .......... 361/87, 96, 88, 361/91, 92, 673; 364/483, 492, 494, 550; 324/141; 200/281

[56] References Cited

U.S. PATENT DOCUMENTS

| | | | |
|---|---|---|---|
| 4,195,211 | 3/1980 | Aslan et al. | 200/153 |
| 4,417,111 | 11/1983 | Kishi et al. | 200/148 R |
| 4,442,329 | 4/1984 | Gray et al. | 200/148 B |
| 4,764,650 | 8/1988 | Bur et al. | 200/153 G |
| 4,780,786 | 10/1988 | Weynachter et al. | 361/87 |
| 4,814,560 | 3/1989 | Akesson | 200/148 |
| 4,864,154 | 9/1989 | Dickey | 307/135 |
| 5,262,605 | 11/1993 | Pham et al. | 200/144 |
| 5,361,184 | 11/1994 | El-Sharkawi et al. | 361/93 |

OTHER PUBLICATIONS

R. Gerald Colclaser, Jr. et al., "Multistep Resistor Control of Switching Surges," IEEE Transactions on Power Apparatus and Systems, vol. PAS-88, No. 7, Jul. 1969.

John H. Brunke et al., "Synchronous Energization of Shunt Capacitors at 230 kV," paper approved for presentation at IEEE PES Winter Meeting, New York, NY, Jan. 29–Feb. 3, 1978; made available for printing Nov. 30, 1977.

R.W. Alexander, "Synchronous Closing Control For Shunt Capacitors," IEEE, 1985.

Sue S. Mikhail et al., "Evaluation of Switching Concerns Associated With 345 KV Shunt Capacitor Applications," IEEE Transactions on Power Systems, vol. PWRD-1, No. 2, Apr. 1986.

Robert A. Jones, "Consideration of Phase-To-Phase Surges in the Application of Capacitor Banks," IEEE Transactions on Power Delivery, vol. PWRD-1, No. 3, Jul. 1986.

(List continued on next page.)

*Primary Examiner*—Edward R. Cosimano
*Assistant Examiner*—Kamini S. Shah
*Attorney, Agent, or Firm*—Woodcock Washburn Kurtz Mackiewicz & Norris LLP

[57] ABSTRACT

An intelligent circuit breaker or switching device system comprises three separate microprocessor-based units, including a condition monitoring unit (CMU) 40, a breaker control unit (BCU) 50, and a synchronous control unit (SCU) 60. The CMU 40 provides detailed diagnostic information by monitoring key quantities associated with circuit breaker or switching device reliability. On-line analysis performed by the CMU provides information facilitating the performance of maintenance as needed and the identification of impending failures. The BCU 50 is a programmable system having self-diagnostic and remote communications. The BCU replaces the conventional electromechanical control circuits typically employed to control a circuit breaker or switching device. The SCU 60 provides synchronous switching control for both closing and opening the circuit interrupters. The control processes carried out by the SCU reduce system switching transients and interrupter wear. The intelligent circuit breaker or switching device system improves system operation and equipment maintenance.

17 Claims, 8 Drawing Sheets

OTHER PUBLICATIONS

G. Moraw et al., "Point–On–Wave Controller Switching of High Voltage Circuit–Breakers," International Conference on Large High Voltage Electric Systems, 1988 Session, Aug. 28–Sep. 3, 1988.

E. Andersen et al., "Synchronous Energizing of Shunt Reactors and Shunt Capacitors," International Conference on Large High Voltage Electric Systems, 1988 Session, Aug. 28–Sep. 3, 1988.

J.H. Ribeiro et al., "An Application of Metal Oxide Surge Arresters in the Elimination of Need For Closing Resistors in EHV Breakers," IEEE Transactions on Power Delivery, vol. 4, No. 1, Jan. 1989.

A. Holm et al., "Development of Controlled Switching of Reactors, Capacitors Transformers and Lines," International Conference on Large High Voltage Electric Systems, 1990 Session, Aug. 26–Sep. 1, 1990.

B.J. Ware, "Synchronous Switching of Power Systems, "International Conference on Large High Voltage Electric Systems, 1990 Session, Aug. 26–Sep. 1, 1990.

Victor Gor, "Shunt Capacitor Bank Switching at 69 kV, 115 kV and 230 kV," EEI Electrical System & Equipment Committee, New Orleans, LA Mar. 29–31, 1993.

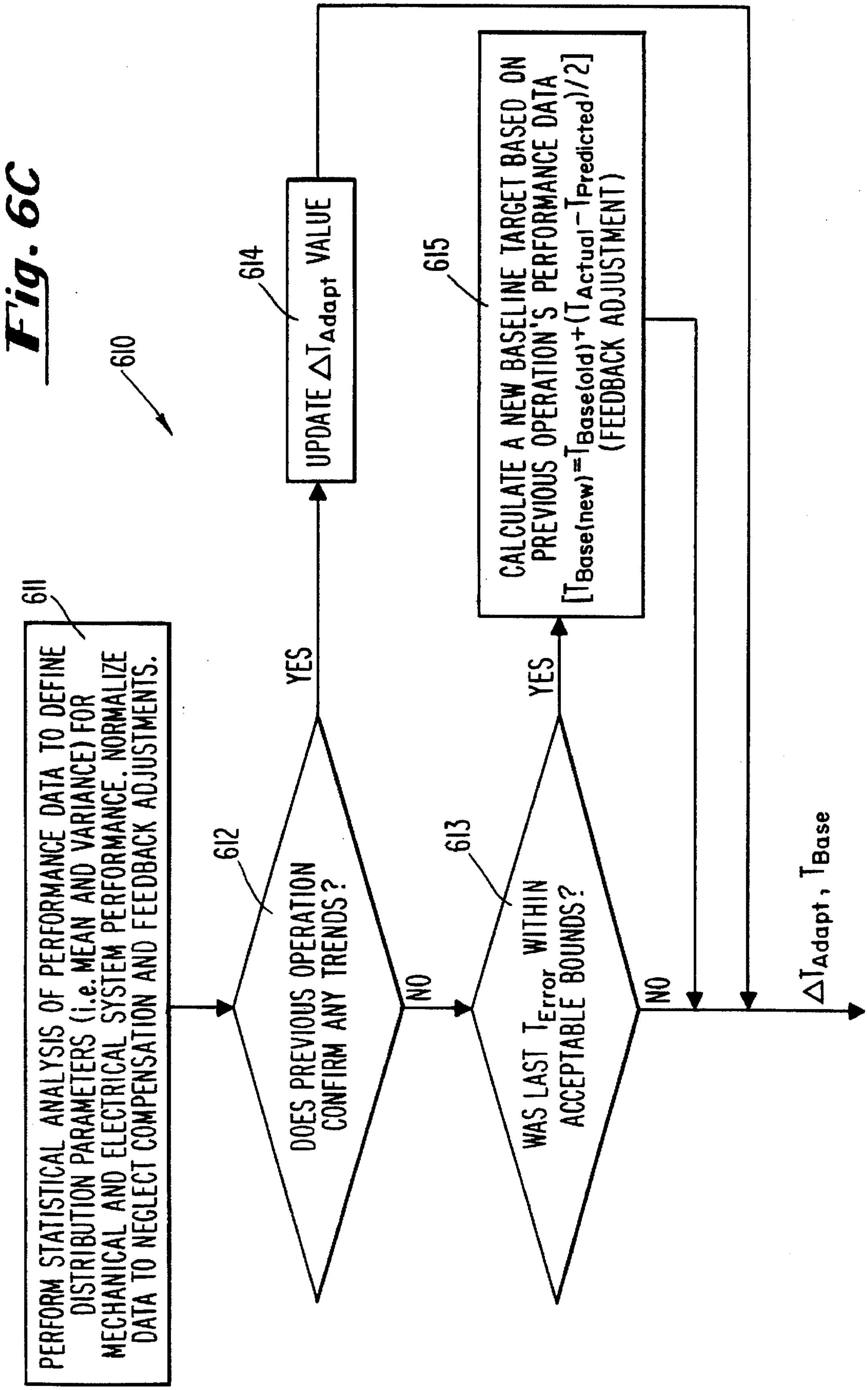

Fig. 6C
610
611
PERFORM STATISTICAL ANALYSIS OF PERFORMANCE DATA TO DEFINE DISTRIBUTION PARAMETERS (i.e. MEAN AND VARIANCE) FOR MECHANICAL AND ELECTRICAL SYSTEM PERFORMANCE. NORMALIZE DATA TO NEGLECT COMPENSATION AND FEEDBACK ADJUSTMENTS.
612
DOES PREVIOUS OPERATION CONFIRM ANY TRENDS?
YES
NO
614
UPDATE $\Delta T_{Adapt}$ VALUE
613
WAS LAST $T_{Error}$ WITHIN ACCEPTABLE BOUNDS?
YES
NO
615
CALCULATE A NEW BASELINE TARGET BASED ON PREVIOUS OPERATION'S PERFORMANCE DATA
$[T_{Base(new)}=T_{Base(old)}+(T_{Actual}-T_{Predicted})/2]$
(FEEDBACK ADJUSTMENT)
$\Delta T_{Adapt}$, $T_{Base}$

INTELLIGENT CIRCUIT BREAKER PROVIDING SYNCHRONOUS SWITCHING AND CONDITION MONITORING

RELATED APPLICATIONS

This application is a division of Ser. No. 08/226,274, filed Apr. 11, 1994.

FIELD OF THE INVENTION

The present invention relates generally to electrical switching devices. More particularly, the present invention relates to an intelligent circuit breaker having a modular architecture and providing synchronous switching and condition monitoring.

BACKGROUND OF THE INVENTION

A preferred application for the present invention is in high voltage three phase circuit breakers. Therefore, the background of the invention is described below in connection with such devices. However, it should be noted that, except where they are expressly so limited, the claims at the end of this specification are not intended to be limited to applications of the invention in a high voltage three phase circuit breaker. For example, the invention disclosed herein may be employed in association with a circuit switcher, circuit breaker, load break switch, recloser, or the like.

A high voltage circuit breaker is a device used in the transmission and distribution of three phase electrical energy. When a sensor or protective relay detects a fault or other system disturbance on the protected circuit, the circuit breaker operates to physically separate current-carrying contacts in each of the three phases by opening the circuit to prevent the continued flow of current. In addition to its primary function of fault current interruption, a circuit breaker is capable of load current switching. A circuit switcher and a load break switch are other types of switching device. As used herein, the expression "switching device" encompasses circuit breakers, circuit switches, load break switches, reclosers, and any other type of electrical switch.

The major components of a circuit breaker or recloser include the interrupters, which function to open and close one or more sets of current carrying contacts housed therein; the operating mechanism, which provides the energy necessary to open or close the contacts; the arcing control mechanism and interrupting media, which interrupt current and create an open condition in the protected circuit; one or more tanks for housing the interrupters; and the bushings, which carry the high voltage electrical energy from the protected circuit into and out of the tank(s) (in a dead tank breaker). In addition, a mechanical linkage connects the interrupters and the operating mechanism.

Circuit breakers can differ in the overall configuration of these components. However, the operation of most circuit breakers is substantially the same. For example, a circuit breaker may include a single tank assembly which houses all of the interrupters. U.S. Pat. No. 4,442,329, Apr. 10, 1984, "Dead Tank Housing for High Voltage Circuit Breaker Employing Puffer Interrupters," discloses an example of the single tank configuration. Alternatively, a separate tank for each interrupter may be provided in a multiple tank configuration. An example of a multiple tank circuit breaker is depicted in FIG. 1.

As shown in FIG. 1, the circuit breaker assembly 1 includes three cylindrical tanks 3. The three cylindrical tanks 3 form a common tank assembly 4 which is preferably filled with an inert, electrically insulating gas such as $SF_6$. The tank assembly 4 is referred to as a "dead tank" because it is at ground potential. Each tank 3 houses an interrupter (not shown). The interrupters are provided with terminals which are connected to respective spaced bushing insulators. The bushing insulators are shown as bushing insulators 5*a* and 6*a* for the first phase; 5*b* and 6*b* for the second phase; and 5*c* and 6*c* for the third phase. Associated with each pole or phase is a current transformer 7. In high voltage circuit breakers, the pairs of bushings for each phase are often mounted so that their ends have a greater spacing than their bases to avoid breakdown between the exposed conductive ends of the bushings. Such spacing may not be required in lower voltage applications. The operating mechanism that provides the necessary operating forces for opening and closing the interrupter contacts is contained within an operating mechanism housing 9. The operating mechanism is mechanically coupled to each of the interrupters via a linkage 8.

A cross section of an interrupter 10 is shown in FIGS. 2A–C. The interrupter provides two sets of contacts, the arcing contacts 12 and 14 and the main contacts 15 and 19. Arcing contacts 12 and main contacts 19 are movable to close or open the circuit. FIG. 2A shows a cross sectional view of the interrupter with its contacts closed whereas FIG. 2C shows a cross section of the interrupter with the contacts open.

The arcing contacts 12 and 19 of high voltage circuit breaker interrupters are subject to arcing or corona discharge when they are opened or closed. As shown in FIG. 2B, an arc 16 is formed between arcing contacts 12 and 14 as they are moved apart. Such arcing can cause the contacts to erode and disintegrate over time. Current interruption must occur at a zero current point of the current waveshape. This requires the interrupter medium to change from a good conducting medium to a good insulator or non-conducting medium to prevent current flow from continuing. Therefore, a known practice (used in a "puffer" interrupter) is to fill a cavity of the interrupter with an inert, electrically insulating gas that quenches the arc 16. As shown in FIG. 2B, the gas is compressed by a piston 17 and a jet or nozzle 18 is positioned so that, at the proper moment, a blast of compressed gas is directed toward the arc, extinguishing it. Once formed, an arc is extremely difficult to extinguish it until the arc current is substantially reduced. Once the arc is extinguished as shown in FIG. 2C, the protected circuit is opened, preventing current flow.

Circuit breakers can switch various devices in the electric utility system. Primarily, these devices include transmission lines, transformers, shunt capacitor banks, and shunt reactors. All circuit breaker switching operations generate closing or opening tranients in the system as the system adjusts to the new set of operating conditioins as a result of the switching operation. Synchronization of circuit breaker closing and opening to system voltage and current waveforms can drastically reduce these transients and, in addition, reduce interrupter wear. For example, shunt capacitor banks are used in utility systems to regulate system voltages as load levels and system configuration changes occur.

Voltage and current transients generated during the energization of shunt capacitor banks have become an increasing concern for the electric utility industry. The concern relates to power quality for voltage-sensitive loads and excessive stresses on power system equipment. For example, modern digital equipment requires a stable source of power. Moreover, computers, microwave ovens, and other electronic appliances are prone to failures resulting from such transients. Even minor transients can cause the power waveform to skew, rendering these electrical devices inoperative. Therefore, utilities have set objectives to reduce the occurrence of transients and to provide a stable power waveform.

Conventional solutions for reducing the transients resulting from shunt capacitor energization include circuit breaker pre-insertion devices, for example, resistors or inductors, and fixed devices, such as current limiting reactors. While these solutions provide varying degrees of success in reducing capacitor bank energization transients, they result in added equipment, added cost, and added reliability concerns.

The maximum shunt capacitor bank energization transients are associated with closing the circuit breaker at the peak of the system voltage waveform, where the greatest difference exists between the bus voltage, which will be at its maximum, and the capacitor bank voltage, which will be at a zero level. Where the closings are not synchronized with respect to the system voltage, the probability for obtaining the maximum energization transients is high. One solution to this problem is to synchronously close the circuit breaker at the instant the system voltage is substantially zero. In this way, the voltages on both sides of the circuit breaker at the instant of closure would be nearly equal, allowing for an effectively "transient-free" energization.

While the concept of synchronous or controlled switching is a simple one, a cost-effective solution has been difficult to achieve, primarily due to the high cost of providing the required timing accuracy in a mechanical system. One solution is to use three separate operating mechanisms and corresponding linkages to synchronously control the operation of each pole individually. U.S. Pat. No. 4,417,111, Nov. 22, 1983, entitled "Three-Phase Combined Type Circuit Breaker," discloses a circuit breaker having a separate operating mechanism and associated linkage for each of the three phases or poles. However the use of three separate operating mechanisms and associated linkages is expensive and increases the overall size and complexity of the circuit breaker.

U.S. Pat. No. 4,814,560, Mar. 21, 1989, "High Voltage Circuit Breaker" (assigned to Asea Brown Boveri AB, Vasteras, Sweden) discloses a device for synchronously closing and opening a three phase high voltage circuit breaker so that a time shift between the instants of contact in the different phases can be brought about mechanically by a suitable choice of arms and links in the mechanical linkage. This linkage uses an a priori knowledge of the time required to close and open the interrupter contacts in each of the three phases. The time differences can be accounted for by an appropriate design of the mechanical linkage. However, such a linkage cannot support dynamic or adaptive monitoring of the voltage waveform of each phase to achieve independent synchronization. Moreover, the mechanical linkage disclosed would require mechanical adjustments over time to account for variations in the circuit breaker performance and operating conditions which often change over time.

SUMMARY OF THE INVENTION

One goal of the present invention is to provide an intelligent and reliable circuit breaker having a modular architecture and means for monitoring and controlling the circuit breaker to improve its reliability and reduce maintenance costs. Another goal of the present invention is to provide a condition monitoring unit for monitoring a variety of parameters associated with the circuit breaker, and to thereby reduce maintenance costs through deferred maintenance and avoid costly unplanned outages by identifying impending failures before they occur. Another goal of the present invention is to provide a synchronous control unit for synchronously opening and/or closing interrupter contacts, and to thereby reduce system switching transients and interrupter wear.

According to one aspect of the present invention, a system for monitoring and controlling a switching device comprises a breaker control unit (BCU), a synchronous control unit (SCU), and a condition monitoring unit (CMU). According to the invention, the BCU, SCU, and CMU are coupled to the switching device in a modular fashion such that any one of the BCU, SCU, or CMU may be removed or replaced when necessary.

The SCU preferably comprises means for effecting the synchronous opening and/or closing of a switched circuit by monitoring a current or voltage waveform on the switched circuit and opening or closing the circuit at a prescribed point on the waveform. In addition, the SCU preferably comprises software, which may be replaced and updated, for controlling the operation of the SCU. The SCU preferably also comprises compensation means for compensating a computed closing or opening time for one or more prescribed operating conditions, and adaptation means for adapting the computed closing or opening time to compensate for trending changes in the switching device. In presently preferred embodiments of the invention, the expression "trending change" refers to a change that exhibits a pattern that may be corrected with feedback control.

In presently preferred embodiments of the SCU, the compensation means includes means for compensating for variations in temperature, control voltage, operating mechanism stored energy, and history, wherein history refers to the time since the switching device was last opened or closed. According to this latter aspect of the invention, the SCU comprises means for determining and compensating for variations in switching time as a function of time since the switching device was last opened or closed, which allows the SCU to compensate for the effects of static friction.

Presently preferred embodiments of the SCU also comprise a lookup table or memory with data indicating an opening or closing time delay as a function of temperature, control voltage, and operating mechanism stored energy. In addition, the adaptation means preferably includes means for determining statistical distribution parameters and determining whether a trending change has occurred on the basis of these parameters. For example, the statistical distribution parameters preferably include the mean and variance of an error comprising the difference between a target switching time and an actual switching time. In preferred embodiments, the actual switching time is determined by detecting the time at which current begins to flow in the switched circuit.

Presently preferred embodiments of a CMU in accordance with the present invention include means for determining the wear condition and operating capability of one or more components or parts of components of the switching device. For example, the switching device may comprise an interrupter and the CMU may include means for determining the wear condition of prescribed components or parts of components of the interrupter. For example, the interrupter components may include arcing contacts, a main insulating nozzle and/or an auxiliary nozzle. The present inventors have discovered that interrupter components include specific points of wear each of which wears (erodes, ablates, or abrades) at a different rate depending upon the imposed arcing current magnitude and duration. Preferably, the CMU employs a separate and unique algorithm to estimate the wear rate for each prescribed wear point. Depending upon the material and the nature of the arc at that point, the algorithm bases the calculated wear on instantaneous current (or the instantaneous current raised to some power) and a proportionality constant. Furthermore, each wear point may or may not experience wear through the entire arcing time (and stroke) of the interrupter. For example, wear in the main nozzle throat does not accumulate until the arcing contacts separate far enough so that the arc propagates in the nozzle throat. The proportionality constant(s) and exponential power(s) employed by the wear rate algorithm may change depending on the arcing time, stroke, and current duration. This change represents different physical wear mechanisms that depend on current magnitude and arc length. Each unique algorithm integrates the accumulated wear by, first, integrating the instantaneous wear time-step-by-time-step over the arcing time of a single interruption. This time step magnitude is typically fractions of a millisecond to 1 millisecond. The entire arcing time of the interrupter is typically 2 milliseconds to 20 milliseconds, although the arcing time is not necessarily limited to that range. The beginning of the arcing is known from either the travel measurement (and knowing the contact separation travel position) or from the sensing of an auxiliary switch. The end of the arcing is known from the current sensing. The accumulated wear for each wear point from each single-event interruption is added to the accumulated wear from prior interruptions to yield a total accumulated wear for each of the wear points.

Presently preferred embodiments of the CMU include means for carrying out a process specifically adapted to estimate the wear rate at each of the specific points of wear. Preferably, each process employed to estimate the wear at the wear points is adapted for contact opening or closing. The present inventors have discovered that wear occurs at some of the wear points whenever arcing occurs, be it in connection with interruption on opening or prestrike on closing. Different algorithms apply to each case for each of the wear points. These different algorithms account for differences in gas flow between opening and closing, which changes the position and nature of the arc and the arc roots.

Presently preferred embodiments of the CMU also include means for determining the accumulated wear for each of the wear points, comparing the accumulated wears to known limit or "end-of-life" values, and signaling an alarm when an estimated wear reaches or exceeds its limit value. According to the invention, the limiting value is determined by the design of the interrupter system, and is the point after which the interrupter is no longer completely able to perform its complete set of rated functions. Preferably, an alarm is activated at some fraction of this end-of-life value, for example, 75% to 90%. Should wear reach the end-of-life value, a more serious alarm is activated, possibly blocking further operation of the switching device (e.g., circuit breaker).

It should be noted that the points of wear can also include other components of the system. For example, a support insulator tube surrounding a contact system may also wear as a function of accumulated interrupted current. The main contacts of a circuit breaker wear in a manner somewhat dependent on current switching conditions. An important aspect of the present invention is that the switching device is divided into a set of "points of wear" each of which has its own unique wear rate algorithm for opening and closing of the contacts, as described above.

It should be noted that an underlying goal of the CMU is to monitor readily available quantities and employ intelligence gained through experience with high voltage circuit breakers and similar switching devices to determine how the monitored quantities relate to the condition of the switching device. For example, in developing the CMU, it was recognized that a majority of failures of a circuit breaker are mechanical in nature. For this reason, preferred embodiments of the CMU emphasize the evaluation of mechanical system performance, i.e., mechanical travel and spring charging system. Other features are included in the preferred embodiments to provide a complete system addressing other important subsystems of the circuit breaker.

In terms of mechanical system experience, extensive knowledge was obtained from mechanical "life" tests, wherein a new circuit breaker was subjected to 5,000 to 10,000 operations to determine mechanical performance and mechanical failure modes. In terms of interrupter wear, knowledge of the materials used within the circuit breaker and how these materials wear with accumulated duties was employed. This knowledge of interrupter material wear was obtained from extensive current interruption design testing on new designs to verify performance. It is believed that, prior to the present invention, there have been no condition monitoring systems for circuit breakers or other switching devices designed to be closely matched to a specific circuit breaker design. On the contrary, it is believed that the only attempts to provide condition monitoring for a circuit breaker were generic in that they attempted to cover all types of circuit breakers designed by various manufacturers. If successful, these prior attempts require the operator (i.e., the utility) to accumulate a large amount of data to determine the significance of any data trends. The data analysis would take place only after a sufficient amount of data has been collected. It is believed that such prior attempts, even if successful, would be inferior to the CMU disclosed in this specification.

Another feature of preferred embodiments of the CMU is the approach used to determine mechanical system damping. Preferred embodiments of the CMU employ an optical pick-up transducer that employs an optical sensor to count bars on a bar strip mounted on a moving part of the circuit breaker, i.e., a drive rod of the mechanism. Damping is typically required at the end of a mechanical system stroke or motion to reduce the speed upon closing or opening and to reduce impact and wear on the mechanical components. For example, the optical pick-up may count the number of bars passing the sensor. When there is too little damping, more bars would pass back and forth past the sensor as the mechanical system bounces. This absolute bar count would indicate damping problems. Similarly, a case of too much damping could also be detected by counting a fewer number of bars which occur in a given period of time. Under either case (too much or too little damping), a bar code may be compared to an established baseline count for a normal damping condition with a tolerance to account for random variations and normal changes which occur with time.

In addition, presently preferred embodiments of the CMU employ an inventive approach for determining operating mechanism spring and charging system condition. The approach described herein focuses on a hydraulic-spring operating mechanism used in many circuit breakers. According to the invention, hydraulic system integrity is checked by monitoring charging motor operation. For example, two monitored quantities may be used to determine the condition of the system. First, the number of motor starts per day are monitored. The number of motor starts per day is combined with a pump-up time measurement when the breaker is at rest to supplement the determination of hydraulic seal problems. It is known that the spring energy in the operating mechanism naturally bleeds down and eventually causes the motor to start in order to recharge the spring. According to the invention, the frequency of motor starts is used to determine when there is excessive bleeding in the hydraulic system. Preferred embodiments of the invention detect the presence or absence of charging motor voltage to determine whether the controls are calling for a charging motor operation.

In preferred embodiments of the invention, a temperature sensor is positioned on the bottom of the switching device, which protects the sensor from direct sunlight. For example, the temperature sensor may be located on the bottom of a middle pole on a common frame (e.g., of a 72–242 kV breaker) or on the middle bottom of every pole (e.g., of a 362 or 550 kV breaker). In addition, cold temperature intelligence may be employed to determine whether there are any gas system leaks. This may be performed by continuously monitoring temperature and pressure and recognizing when the liquification point of $SF_6$ gas is reached. Any changes in pressure and temperature while in this transition state can be tracked along a saturated vapor line of an $SF_6$ state diagram.

The CMU may also be programmed to monitor the performance of an electromechanical relay control system used in association with a circuit breaker. For example, the relay control system's performance will preferably be monitored in terms of trip circuit performance and close circuit performance. Close circuit performance may be evaluated by determining the time from receiving a close signal to when certain relays pick up. The trip circuit performance may be evaluated based upon the time from a trip signal initiation to the operation of certain other contacts that indicate circuit breaker position. Problems with auxiliary contacts may be isolated from other mechanical system problems by using the operating mechanism travel curve to determine actual circuit breaker position. These two operating times may be compared to baseline parameters to determine control circuit problems.

In sum, the CMU preferably characterizes mechanism performance with three measurements: (1) reaction time, defined as the elapsed time from close coil energization to the first transition generated by an optical pick-up; (2) velocity, measured during free travel without the effect of contact make/break or damping; and (3) absolute travel, defined as the total distance travelled by the mechanism with both directions taken as positive travel. Excessive overshoot or rebound results in absolute travel which is too long. Other abnormal conditions can result in absolute travel which is too short. These three simple measurements provide a novel method for monitoring mechanism travel using an optical linear displacement transducer.

Preferred embodiments of the SCU may be summarized as follows. The SCU is required to estimate the switching device (e.g., circuit breaker) closing time to target a voltage zero. Laboratory tests established the closing time for a range of temperature, control voltage, and spring charge. This procedure yields a three-dimensional function (or look-up table) for closing time, given values for temperature, control voltage, and spring charge. However, this requires a large amount of computer memory. The method has been improved by separating the function into the sum of three independent terms, one for each parameter. Thus, the closing time is estimated using a base time plus an adjustment for each measured parameter. The expression "compensation" refers to this method of adjusting the base time for temperature, control voltage, and spring charge. For example, in presently preferred embodiments of the invention, specific compensation tables are associated with a particular model of circuit breaker. Each type of breaker has a set of compensation tables associated with it. These tables are determined in the laboratory and further reduced into three smaller look-up tables.

Presently preferred embodiments of the SCU attempt to close on a voltage zero and measure the actual performance in terms of timing error. The timing error is the elapsed time between the inception of current flow and the nearest voltage zero. This error is partly due to the fact that the compensation is typically not exact, and partly due to the effect of variables other than temperature, control voltage, and spring charge. Adaptation refers to the process of mitigating the effects of this timing error over time. In one presently preferred embodiment of the SCU, a proportional integral derivative (PID) feedback control loop is employed to determine an error term that is added to the compensation expression. The PID gains are established by statistical analysis and verified experimentally using a circuit breaker simulator.

In addition, presently preferred embodiments of the SCU perform "compensation," which refers to compensating for temperature, control voltage, and spring charge using laboratory or pre-established data. In this embodiment, there is no attempt to adjust the compensation to reduce error. Error is treated as an independent term. Other embodiments of the SCU may include means for changing (or adapting) the compensation to correct for error. This will require correlation of error to each of the measured parameters instead of treating error independently.

Other features and advantages of the present invention are disclosed below.

BRIEF DESCRIPTION OF THE DRAWINGS

FIGS. 6A, 6B, and 6C are flow diagrams of the processes performed by the synchronous control unit 60.

DETAILED DESCRIPTION OF PREFERRED EMBODIMENTS

Figure 1:
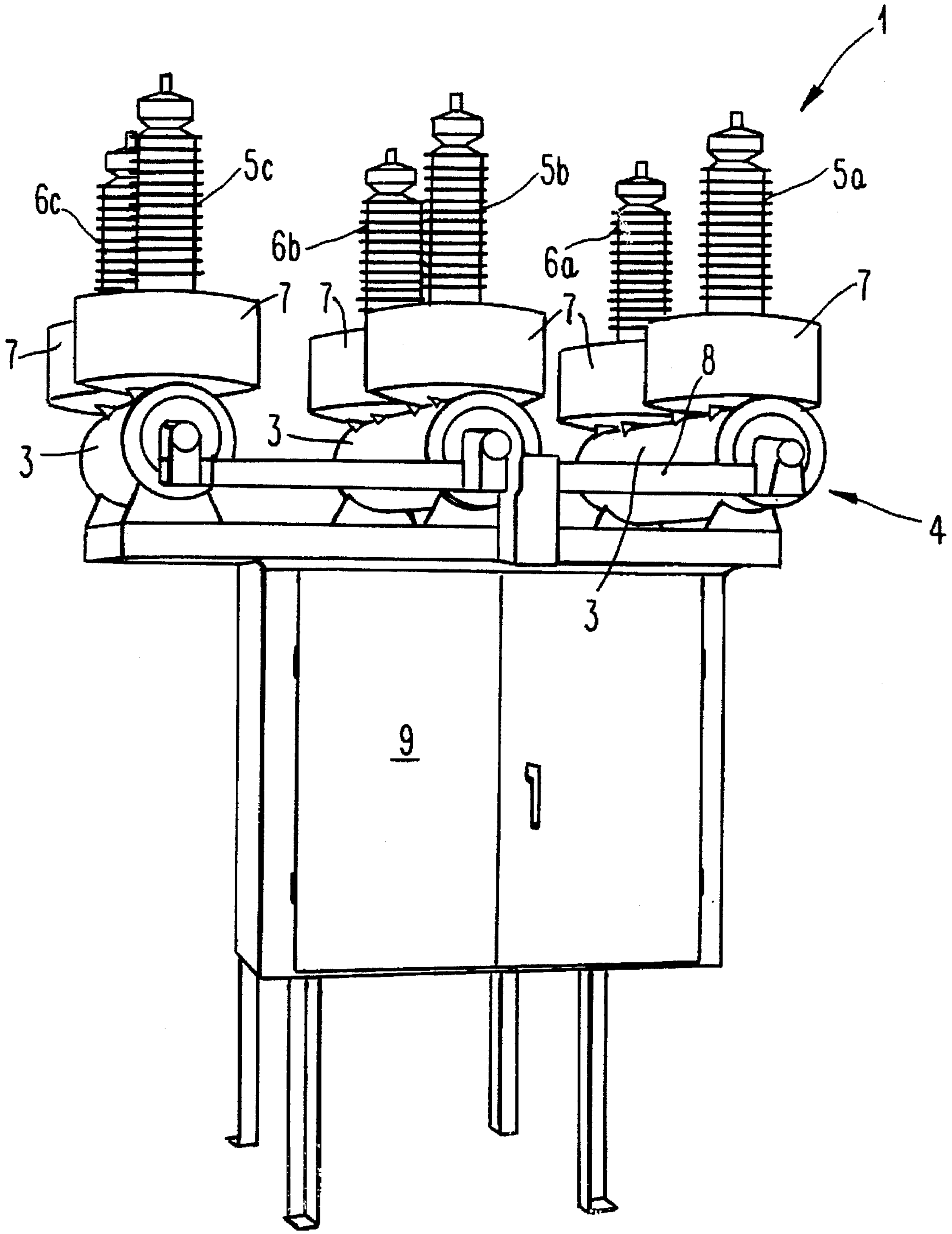
FIG. 1 is a diagram of a multiple tank high voltage circuit breaker.
Figure 2A:
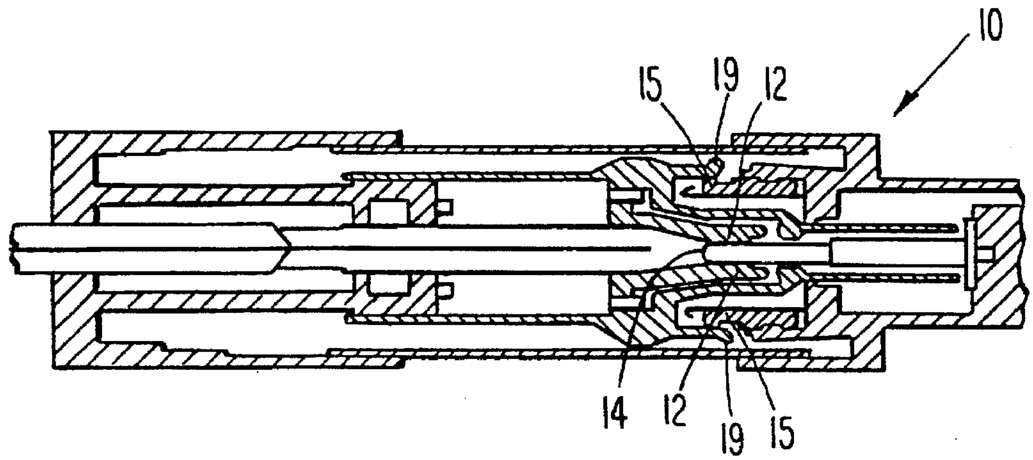
FIG. 2A is a cross-sectional view of an interrupter with its contacts closed.
Figure 2B:
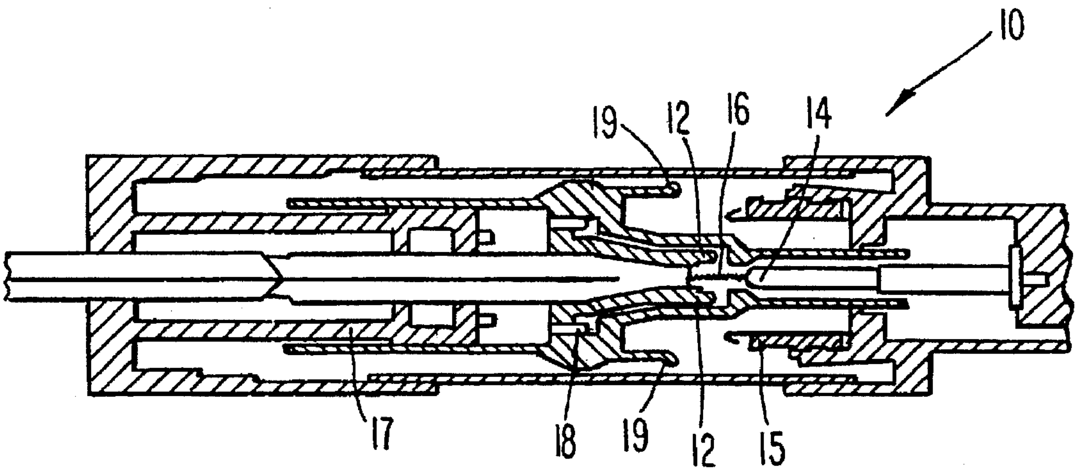
FIG. 2B is a cross-sectional view of an interrupter with an arc formed between its arcing contacts.
Figure 2C:
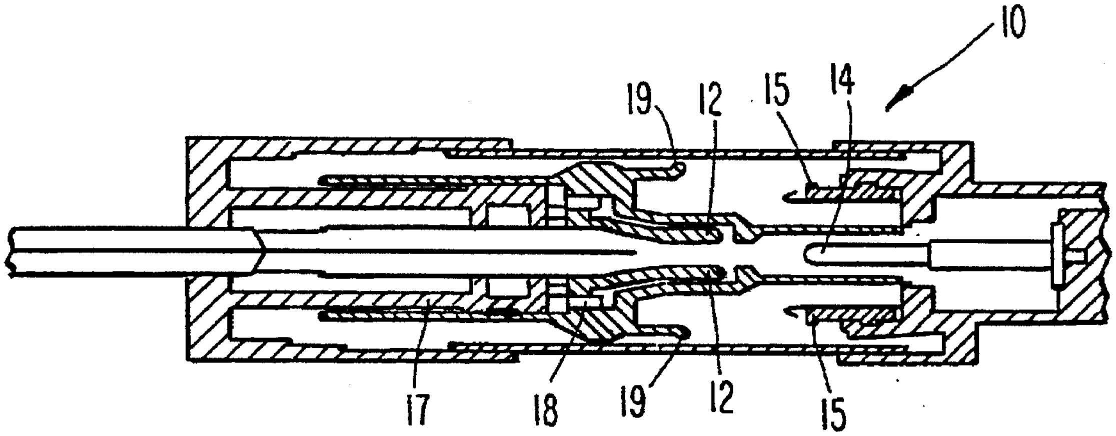
FIG. 2C is a cross-sectional view of an interrupter with its contacts open.
Figure 3:
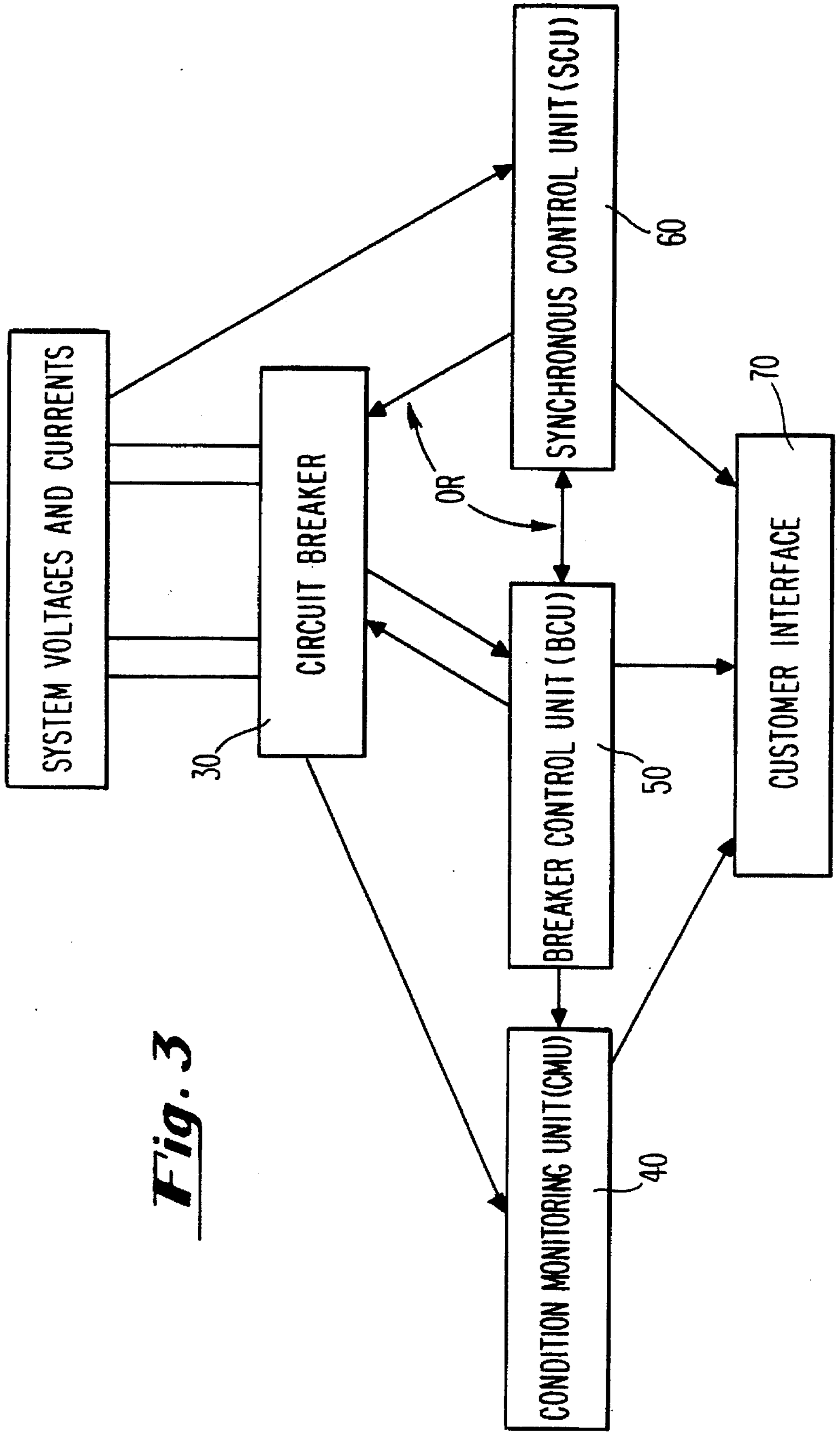
FIG. 3 is a block diagram of an intelligent circuit breaker comprising a condition monitoring unit 40, a breaker control unit 50, and a synchronous control unit 60.

As shown in FIG. 3, preferred embodiments of an intelligent circuit breaker system in accordance with the present invention comprise three separate microprocessor-based units, including a condition monitoring unit (CMU) 40, a breaker control unit (BCU) 50, and a synchronous control unit (SCU) 60. Preferred embodiments of the invention also include a customer interface 70. The CMU 40 provides detailed diagnostic information by monitoring key quantities associated with circuit breaker reliability. In addition, on-line analysis performed by the CMU provides information facilitating the performance of maintenance as needed and the identification of impending failures. The BCU 50 is a programmable system having self-diagnostic and remote communications. In preferred embodiments, the BCU replaces the conventional electromechanical control circuits typically employed to control a circuit breaker. The SCU 60 provides synchronous switching control for both closing and opening the circuit interrupters. The control processes carried out by the SCU reduce system switching transients and interrupter wear. The intelligent circuit breaker system improves system operation and equipment maintenance. Moreover, multiple intelligent circuit breaker systems may be integrated through substation expert systems to achieve greater operational benefits. One preferred application of the present invention is in connection with a high voltage circuit breaker for a 500 kV electrical transmission network.

Presently preferred embodiments of the invention employ a modular system that distributes key functions in separate microprocessor-based devices located in the circuit breaker control cabinet. A key advantage of this approach is improved reliability. For example, a failure of the CMU 40 or SCU 60 will not make the circuit breaker inoperable. Furthermore, two or more BCUs can be employed as redundant units, providing a cost-effective method for maximizing availability of the circuit breaker control system. The CMU 40, BCU 50, and SCU 60 are each described in detail below.

I. Condition Monitoring Unit

Figure 4:
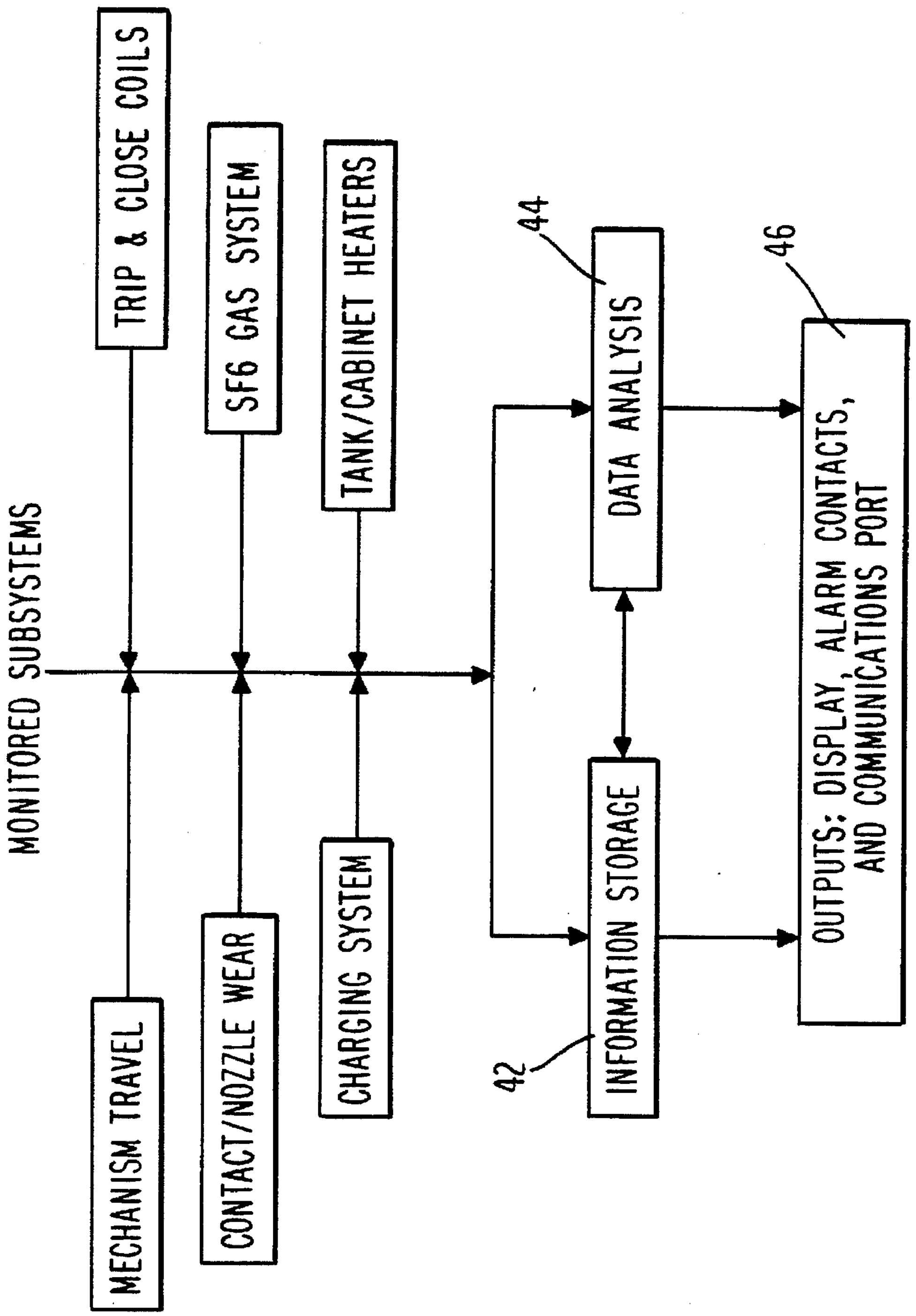
FIG. 4 is a block diagram of the condition monitoring unit 40.

The condition monitoring unit 40 operates as indicated in FIG. 4. As shown, the CMU monitors a variety of parameters associated with the circuit breaker. The CMU includes an information storage device (memory) 42, a data analysis device 44, and outputs 46, the latter including a display, alarm contacts, and a communications port.

Preferred embodiments of the CMU 40 are stand-alone units that can be integrated with the BCU 50 without relying on the BCU for operation. This separation of systems allows existing circuit breakers with electromechanical breaker control systems to be retrofitted with the CMU. In presently preferred embodiments of the invention, the diagnostics approach used by the CMU relies on a 90%/10% rule. In other words, about 90% of the diagnostics information is provided by about 10% of the effort. Complex diagnostic methods, such as acoustic pattern recognition, are not used. Instead, a simple system is employed to provide diagnostic information. Operating experience is used to define future expansion of the CMU. Table I lists the diagnostic features and monitored quantities of the CMU.

TABLE I

| Diagnostic Feature | Monitored Quantity |
|---|---|
| Interrupter wear<br>arcing contacts<br>nozzles | Phase current, arcing time |
| Gas system integrity<br>leakage rate | SF6 pressure, temp. |
| Charging system conditions | Motor currents |
| Tank/cabinet heater condition<br>full heater failure<br>partial heating element failure | Heater currents |
| Trip and close coil condition<br>coil failure<br>circuit continuity | Coil current, continuity |
| Mechanical system condition<br>linkage deterioration<br>lack of lubrication<br>bearing failure<br>hydraulic system leaks<br>broken spring | Travel, operating times, motor current, speed, auxiliary contacts |

Outputs of the CMU preferably include two alarm contacts and three indicating lights. For example, a green light may indicate that all monitored systems are normal; a yellow light may indicate one or more conditions of concern; and a red light may indicate a condition requiring immediate attention. An LCD display and push buttons are preferably employed to obtain more detailed information on any alarm condition. Appropriate networking may also be employed to allow remote access to detailed alarm information. The CMU 40 provides maintenance cost savings through deferred maintenance and can reduce costly unplanned outages by identifying impending failures before they occur.

Further details of one exemplary embodiment of the CMU 40 are described below.

Monitored Subsystems

The CMU records mechanism travel as a function of time on the basis of information obtained from contacts and an optical pick-up. A digital input (the "a" contacts) will indicate when the breaker is in the open position. This contact is open when the breaker is open and closed when the breaker is closed. Another set of contacts (the "b" contacts) are closed when the breaker is open and open when the breaker is closed. In addition to these digital inputs, an optical pick-up on the mechanism arm generates a square wave, making a transition, e.g., every millimeter of travel. In one embodiment, the optical pick-up may be adjusted to generate a transition within the first two millimeters of travel and every millimeter thereafter.

The information obtained from the "a" and "b" contacts and the optical pick-up is used to provide on-line measurement of reaction time, mid-stroke velocity, and absolute travel. Reaction time is defined as the elapsed time from when the trip/close coil is energized to the first transition of the optical pick-up on the operating mechanism. For example, expected values are in the range of five to twenty milliseconds.

Velocity is defined as the average rate of linear travel measured from the first or second optical transition after main contact part of ten milliseconds. In one embodiment, it is measured in meters/second and computed to the nearest decimeter/second. For example, a trip velocity greater than twenty-five meters/second or a close velocity greater than ten meters/second results in a danger alarm. If reaction time and velocity are not within normal range, the travel curve is stored in memory in an "Abnormal Operation" log for later analysis. One embodiment of the CMU can measure travel on three independent mechanisms. A single-pole version has only one mechanism travel input.

Contact and Nozzle Wear

Contact and nozzle wear are a function of mechanism position and current. Therefore, the required inputs are phase current from the current transformer (CT) secondary and mechanism position. A low-pass filter is included to prevent alias current signals.

In one embodiment of the CMU, seven regions or cells of the interrupters are monitored for cumulative wear, including:

arcing finger tip,
arcing finger inside diameter,
plug tip,
plug outside diameter,
auxiliary nozzle,
main nozzle plug side,
main nozzle finger side.

Each of these cells has a specific mathematical expression that relates mechanism travel and arcing current to wear. This wear, expressed in "percent of useful life," is accumulated for each cell and stored in memory. Alarm set points are used to alert operating and maintenance personnel when any of the cells are approaching the end of their useful life.

Arcing current waveforms are recorded in order to calculate contact and nozzle wear. The raw data is not retained in memory unless the operation is determined to be abnormal. An abnormal operation involves an alarm for slow reaction time, high or low velocity, or excessive contact/nozzle wear. Excessive contact/nozzle wear is defined as loss of more than 1% of life in a single operation. One embodiment of the CMU can monitor wear on three sets of contacts and nozzles. A single-pole version monitors one set.

Spring Charging (Pump Motor)

A hydraulic system may be employed to provide the energy for charging springs that trip the interrupters. According to the present invention, hydraulic system integrity is checked by monitoring pump operation. The number of starts per day when the breaker is at rest is a good indicator of hydraulic seal condition. The pump-up time (in seconds) after an operation also indicates the hydraulic system's condition. The presence or absence of pump voltage is used to determine whether the controls are calling for pump operation. The potential is not measured by the CMU except to determine whether it is above 30 volts AC or DC. Motor current may be used to detect an open armature or locked rotor. The actual current is not required, except to determine which of the following ranges it falls within:

| | |
|---|---|
| off or open armature | less than 1 amp AC or DC |
| normal running range | 1 to 15 amps |
| locked rotor or starting | over 15 amps |

$SF_6$ Gas Density $SF_6$ gas density is computed by measuring gas pressure and tank temperature. The temperature input comes from a resistive temperature device (RTD) mounted on the tank exterior. Pressure signals originate in a strain gage transducer mounted on a circuit board. State equations are used to determine gas density, displayed as temperature-corrected pressure for insulating gas. Alarms can be set up for low density or high rate of pressure loss.

Trip and Closing Coils

Each trip and close coil is monitored for control signals and continuity. A low-level current is continuously passed through the coil to assure continuity. Loss of continuity results in an alarm, regardless of whether or not the coil is called upon to operate. One embodiment of the CMU can watch nine coils, including three closing, three primary and three secondary trip coils.

Heaters

In one embodiment of the CMU, up to six heaters can be monitored for continuity, open elements, and proper operation. Two of the inputs are for heaters that are always energized (no thermostat control). These are monitored for continuous operation and do not require continuity checking. The remaining four inputs handle controlled heaters and include a continuity check for when the heaters are off. Monitored heaters may be installed on the tank, mechanism, main control cabinet or auxiliary (pole) cabinets.

Information Storage

The CMU stores five types of data: operation summary, alarm log, spring charge log, abnormal operation log, and cumulative data. These are described below.

Operation Summary

Every time the circuit breaker operates, an entry is made in an "Operation Summary" table or memory. This preferably includes the following information:

operation number (from counter),
date and time,
type (close or open),
reaction time, velocity, absolute travel,
arcing finger tip and i.d. wear,
plug tip and o.d. wear,
main nozzle plug and finger side wear,
auxiliary nozzle wear,
mechanism temperature.

For example, an entry could be as follows:

| Number | Date | Type | React | Vel | Temp | Contact/ Nozzle Wear |
|---|---|---|---|---|---|---|
| 2745 | 11/10/94 | Open | 6 | 8.4 | 23 | 12, 10, 7, 3, 15, 2, 4 |

In one embodiment of the CMU, contact/nozzle wear is incremental (attributed to that operation) and not cumulative. The wear is expressed as percent of life times 100. For example, an operation resulting in 12% loss of life would be recorded as 12.

Alarm Log

The alarm log has an entry for each occurrence of an alarm. The following is a list of possible alarms:

slow trip reaction time,
slow closing reaction time,
low trip velocity,
low closing velocity,
high mechanism temperature,
excessive arcing finger wear,
excessive plug wear,
excessive nozzle wear,
frequency spring re-charging,
long spring charging time,
low temperature-corrected gas pressure,
high rate of gas pressure decay,
primary trip coil open, secondary trip coil open,
closing coil open,
malfunctioning heater.

In one embodiment of the CMU, memory is allocated to hold up to 100 such entries, using a total of about 800 bytes. This includes a date/time stamp, description of the alarm, and the measured value that caused the noted condition. Alarms associated with an operation may also include the operation number. Alarm log entries may appear as follows:

| | | | | |
|---|---|---|---|---|
| 03/24/94 | 13:21:57 | slow trip reaction time | 14 msec | 1435 |
| 11/03/94 | 03:13:32 | low gas pressure | 18 psig | |

Spring Charge Log

Every time the pump operates, an entry is preferably made in the spring charge log. For example, this entry may include a date/time stamp and the duration of the pump-up. In one embodiment, every entry requires about four bytes of memory.

Abnormal Operation Log

Whenever an operation is determined to be abnormal, a travel curve and current waveform are stored for later engineering analysis. An operation is deemed abnormal when reaction time, velocity, or contact/nozzle wear are not within normal bounds. For reaction time and velocity, normal bounds are defined as the caution alarm settings. In one embodiment, normal bounds for contact and nozzle wear per operation are defined as more than 1% loss of life for a single operation.

Cumulative Data

Cumulative data includes averages and extreme values from logged data and collective contact/nozzle wear. This information can be displayed on the LCD as desired. In one embodiment of the CMU, the cumulative information includes the following items, each of which is briefly described:

| | |
|---|---|
| average trip reaction time | the average of all reaction times for trip operations stored in the operation summary, computed to the nearest whole millisecond |
| averaging closing reaction time | same as above for close operations |
| average trip velocity | the average of all trip velocities in the operation summary, computed to the nearest decimeter per second |
| average closing velocity | same as above for close operations |
| maximum trip reaction time | the maximum of all reaction times for trip operations stored in the operation summary, computed to the nearest whole millisecond |
| maximum closing reaction time | same as above for close operations |
| minimum trip velocity | the minimum of all trip velocities in the operation summary, computed to the nearest decimeter per second |
| minimum closing velocity | same as above for close operation |
| arcing finger wear | (tip and inside diameter) |
| plug wear | (tip and outside diameter) |
| main nozzle wear | (plug side and finger side) |
| auxiliary nozzle wear | cumulative wear in various regions (or cells) defined on the arcing contacts and nozzles, expressed in terms of percent remaining life |
| average spring charge frequency | the average number of pump starts per day, not counting pump-up immediately after an operation of the breaker, for all pump operations stored in the spring charge log |
| maximum spring charge frequency | the maximum number of pump starts per day, not counting pump-up immediately after an operation of the breaker, for all pump operations stored in the spring charge log |
| operations counter | the total number of breaker operations |

CMU Outputs

In one preferred embodiment, the CMU has three high-intensity LEDs to indicate equipment condition, a liquid crystal display, and two alarm contacts to indicate caution or danger. The LEDs are defined as follows:

| | |
|---|---|
| green | power on, all monitored systems normal; |
| yellow | equipment operational but one or more monitored subsystems are marginal (caution alarm); |
| red | the monitor has detected a serious problem (danger alarm). |

The LCD and push buttons are used by the operator to obtain more specific information.

Displays on the Liquid Crystal Display

There are three push buttons on the CMU that control what information is displayed on the liquid crystal. The buttons are labelled "Present Conditions," "Abnormal/Alarm" "Description," and "Settings."

There are a variety of condition screens that may be displayed:

1) average and maximum trip reaction time,
2) average and maximum close reaction time,
3) average and minimum trip velocity,
4) average and minimum closing velocity,
5) cumulative arcing finger wear, tip and inside diameter,
6) cumulative plug wear, tip and outside diameter,
7) cumulative nozzle wear, auxiliary, finger and tip sides,
8) average and maximum pump-up frequency,
9) average and maximum pump-up time,
10) pump status (on or off),
11) temperature-corrected gas pressure,
12) control coil conditions,
13) heater conditions and status (on or off),
14) mechanism temperature.

A push button may also be used to display the present status (e.g., "All Monitored Subsystems Normal" or "ALARM").

Another pushbutton may be used to set various alarm levels, a clock, and a calendar. In one preferred embodiment, there are several screens the user employs to set alarm points:

1) maximum trip reaction time,
2) maximum close reaction time,
3) minimum mid-stroke trip velocity,
4) minimum mid-stroke close velocity, 5) minimum arcing finger useful life remaining,
6) minimum plug useful life remaining,
7) minimum nozzle useful life remaining,
8) maximum hydraulic pump-up interval at rest,
9) maximum pump-up time,
10) minimum temperature-corrected gas pressure,
11) maximum rate of gas pressure decay.

There are also screens for setting the data/time, for clearing memory, and for resetting variables:

12) set month, day and year,
13) set hour, minute, and second,
14) set/reset operations counter,
15) set/reset contact and nozzle remaining life,
16) clear memory.

Alarms and Set Points

In one preferred embodiment, the CMU 40 has a yellow indicator light and a corresponding alarm contact for cautionary circumstances that are not an immediate threat to the circuit breaker. A second set of contacts and a red indicator are used to signal immediate danger. The customer can set various alarm levels and classify each as a caution or danger alarm. For example, the CMU could close the caution alarm contacts for a trip reaction time above 6 milliseconds and the danger alarm contacts for a trip reaction time above 8 milliseconds. Alarms that may be set by the customer in one preferred embodiment include:

| | |
|---|---|
| trip reaction time | milliseconds |
| closing reaction time | milliseconds |
| trip velocity | meters/second |
| closing velocity | meters/second |
| arcing finger wear | percent life |
| plug wear | percent life |
| nozzle wear | percent life |
| frequency of spring charge at rest | starts/day |
| spring charge time | seconds |
| temperature-corrected gas pressure | psig |
| rate of gas pressure decay | psi/second |
| control coil continuity | good/bad |
| heater operation and continuity | good/bad |

Additional alarms have constant set points:

| | |
|---|---|
| single-operation finger | 100 × % life |
| single-operation plug wear | 100 × % life |
| single operation nozzle wear | 100 × % life |

The items listed above are described below.

Trip reaction time: For each trip operation, the reaction time is measured and compared to alarm settings. The caution alarm is logged and activated if the measured time is greater than the caution alarm setting but less than the danger alarm setting. If the reaction time is greater than the danger alarm setting, the danger alarm is logged and activated and the caution alarm is not. This alarm is cleared when a trip operation occurs within a reaction time below the alarm setting or in one hour, whichever is later.

Closing reaction time: Description is the same as above for closing operations.

Trip velocity: For each trip operation, the velocity is measured and compared to alarm settings. If the measured velocity is less than the caution alarm setting but greater than the danger alarm setting, the caution alarm is logged and activated. If the velocity is less than the danger alarm setting, the danger alarm is logged and activated and the caution alarm is not. This alarm is cleared when a trip operation occurs with a velocity above the alarm setting or in one hour, whichever is later.

Closing velocity: Description is the same as above for closing operations.

Arcing finger wear: Tip and inside diameter.

Plug wear: Tip and outside diameter.

Main nozzle wear: Plug side and finger side.

Auxiliary nozzle wear: For each trip or closing operation, the wear on each region of the contacts and nozzle is computed. If the loss of life is between 1% and 2% on any region because of a single operation, the caution alarm is logged and activated. If the loss of life exceeds 2% on any region, the danger alarm is logged and activated and the caution alarm is not. This alarm is cleared after one hour. Wear is also accumulated for each of the seven regions. If remaining life is below the caution alarm setting, an alarm is logged and activated. If the remaining life is below the danger alarm setting, a danger alarm is activated. This alarm is not cleared until the conditions causing the alarm are corrected. This could include resetting the alarm levels or cumulative wear.

Spring charge frequency: The CMU scans the pump operation log every hour to determine the average number of pump starts per day, not including pump-up associated with an operation of the breaker. The unit of measure is starts/day. This information used to compute the average may include several days or just a partial day. If the frequency is greater than the caution alarm setting but less than the danger alarm setting, the caution alarm is logged and activated. If the frequency is greater than the danger alarm setting, the danger alarm is logged and activated and the caution alarm is not. This alarm is cleared when the conditions causing the alarm are corrected. This could include resetting the alarm levels or reducing the number of pump operations.

Spring charge duration: The duration of operation (seconds) is measured each time the pump operates. If the duration is greater than the caution alarm setting but less than the danger alarm setting, the caution alarm is logged and activated. If the duration is greater than the danger setting, the danger alarm is logged and activated and the caution alarm is not. This alarm is cleared when a pump operation occurs with a duration below the alarm setting or in one hour, whichever is later.

Gas pressure—$SF_6$ gas temperature and pressure are measured and temperature-corrected gas pressure is computed every second. These one-second samples are combined to obtain an hourly average corrected gas pressure. If the corrected pressure is less than the caution alarm setting but greater than the danger alarm setting, the caution alarm is logged and activated. If the corrected pressure is less than the danger alarm setting, the danger alarm is logged and activated and the caution alarm is not. This alarm is cleared when the conditions causing the alarm are corrected. This could include resetting the alarm levels or correcting the gas density problem.

Control coil continuity: Every trip and close coil is monitored each second to assure electrical continuity. A danger alarm is logged and activated if any coil is found to be electrically open. The alarm does not clear until the offending coil is repaired.

Heater condition/continuity: Every heater is monitored each second to assure electrical continuity and proper operation. A caution alarm is logged and activated if any heater is found to be electrically open or not operating when required. The caution alarm does not clear until the offending heater is repaired. Mechanism and tank temperatures are also monitored. The caution alarm elevates to a danger alarm if the mechanism temperature is below safe levels.

Communications

In preferred embodiments of the CMU 40, a serial port is provided to support communications. Simple, ASCII commands are used for the initial interface including the following serial port commands:

1) report alarms that are currently active,
2) list the present conditions,
3) list alarm settings,
4) upload the alarm log,
5) upload the pump operation log,
6) upload the operation summaries,
7) upload the abnormal operation log,
8) clear any of the above logs.

All commands include a unit ID to support multi-drop communications.

II. BREAKER CONTROL UNIT

The BCU 50 employs programmable logic controllers (PLCs) to replace the conventional electromechanical control devices typically employed in a breaker control unit. Programmable logic controllers are well known and have been proven to be reliable. The critical nature of the circuit breaker control function dictates the use of such a proven technology. Furthermore, the PLC hardware and software represents a one-to-one replacement of contact-multiplying relays and time-delay relays.

Presently preferred embodiments of the invention employ a programming environment known as "ladder logic." The use of ladder logic simplifies circuit breaker control circuits by using relay equivalent symbols to process PLC inputs and outputs. For example, an "a" contact wired into a PLC input would appear graphically as a normally-opened contact in the PLC program. Input contacts would then be "wired" within software to create the necessary output conditions. In the case of circuit breaker controls, the outputs include trip and close coils and alarm contacts. In preferred embodiments of the invention, control logic such as anti-pumping, pole disagreement, and lock-out on low gas pressure or spring charge are all performed with the PLC ladder logic program. The benefits of this approach include a reduction in the number of components used in the control system and a reduction in wiring within the control cabinet, since contacts are multiplied and arranged for logic with software. In addition, commercially available PLCs have comprehensive self-diagnostic capabilities that can provide specific information about a failure within a PLC. Therefore, the problem can be corrected quickly with minimal troubleshooting. When supplied as a redundant component, the BCU 50 far surpasses the reliability of conventional electromechanical controls. Another significant benefit of this approach results from the ability to use fiber optic cabling for circuit breaker control and monitoring.

Figure 5:
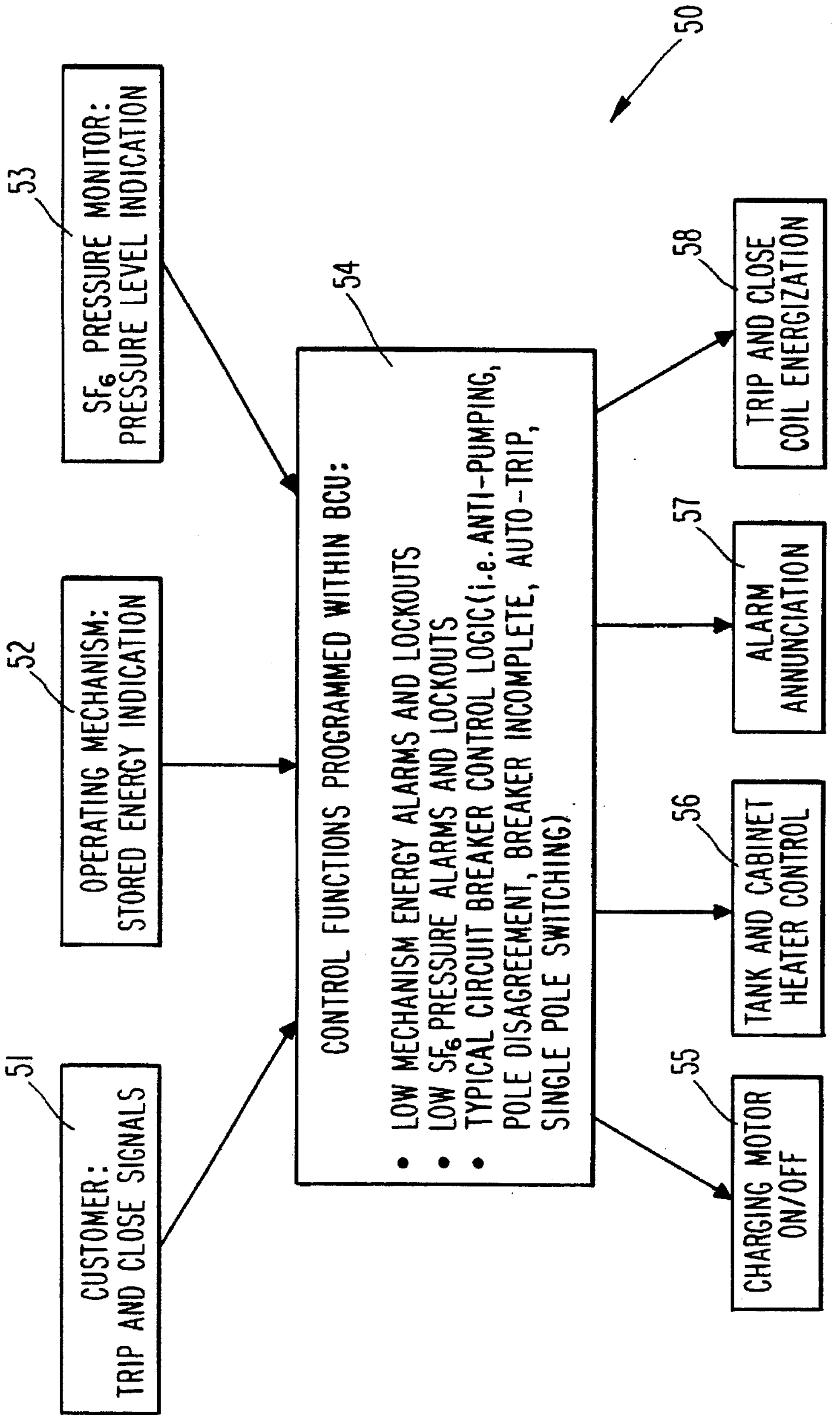
FIG. 5 is a block diagram of the breaker control unit 50.

Referring now to FIG. 5, the BCU 50 includes means 51, 52, 53 for receiving trip and close signals, an operating mechanism stored energy indication, and a gas ($SF_6$) pressure level indication, respectively. In addition, control functions 54 programmed within the BCU 50 include low mechanism energy alarms and lock-outs, low $SF_6$ pressure alarms and lock-outs, and typical circuit breaker control logic (e.g., anti-pumping, pole disagreement, breaker incomplete, auto trip, single pole switching). The BCU 50 also includes means 55, 56, 57, 58 for outputting a charging motor on/off signal, a tank and cabinet heater control signal, an alarm annunciation signal, and a trip and close energization signal, respectively.

III. SYNCHRONOUS CONTROL UNIT

Figure 6A:
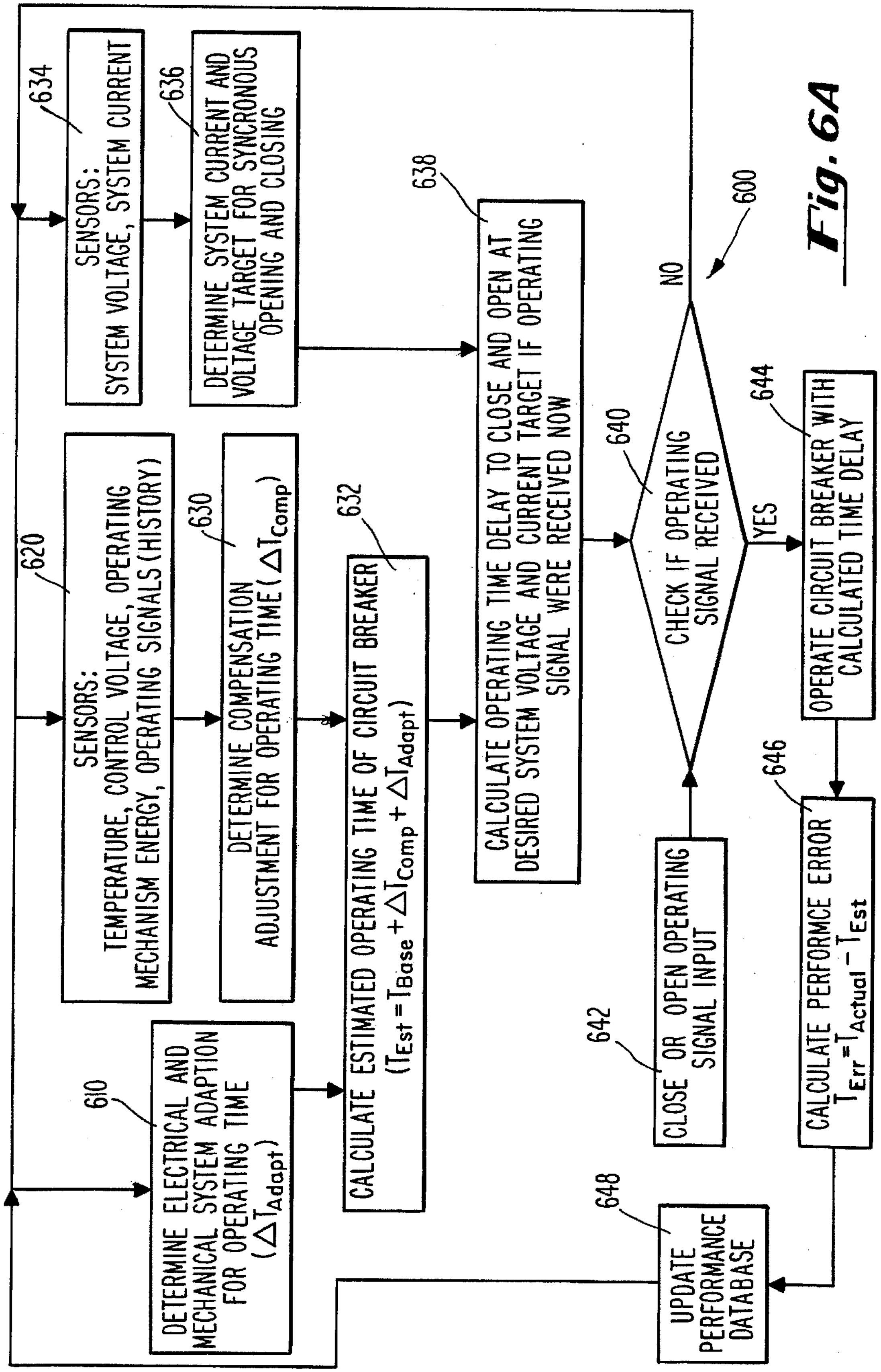
Figure 6B:
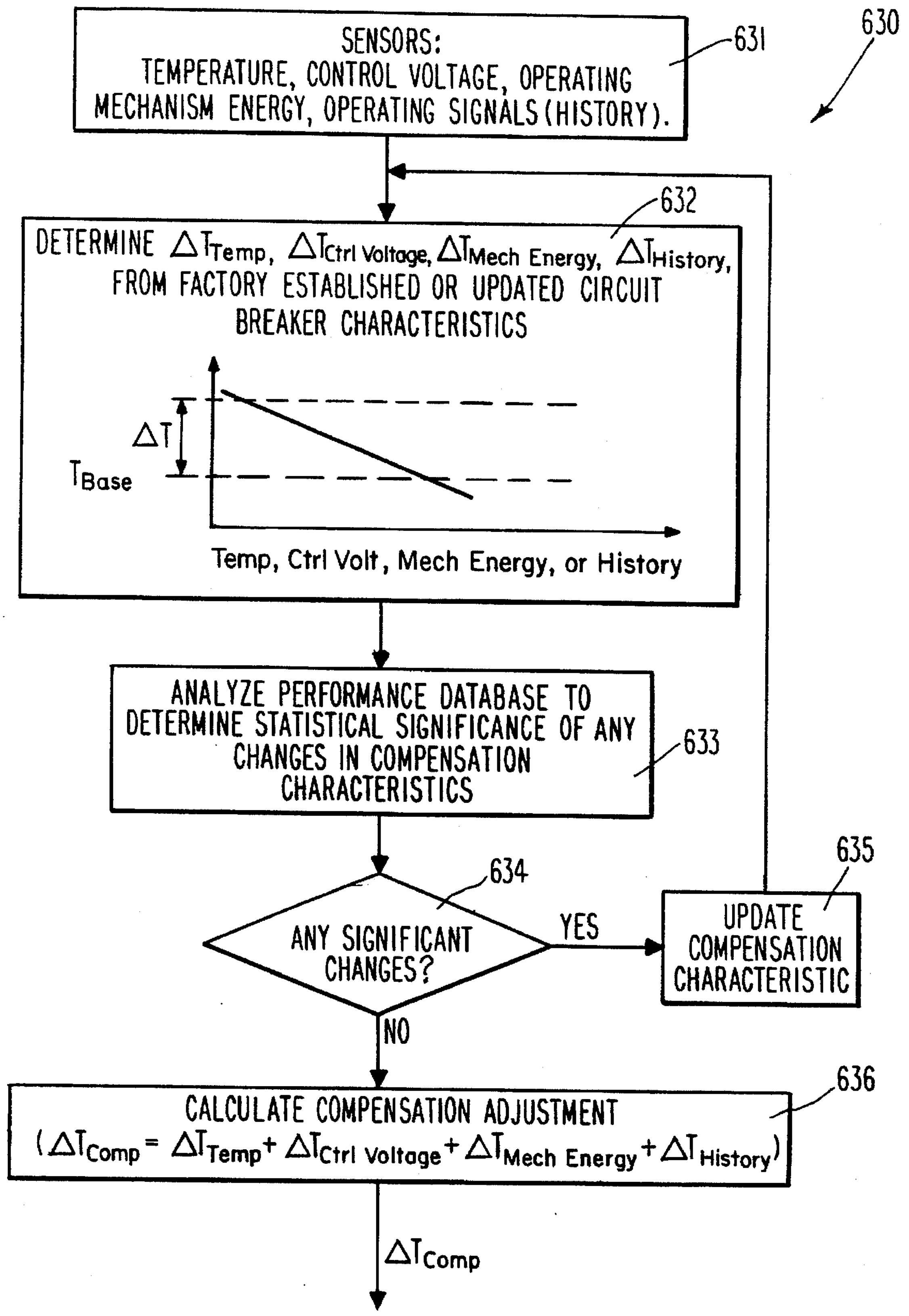

The processes performed by preferred embodiments of the SCU 60 are depicted in FIGS. 6A, 6B, and 6C. Briefly, the SCU provides synchronous switching by monitoring system currents and voltages and timing the opening and/or closing of the circuit breaker to coincide with a voltage or current zero crossing or peak, as required. The SCU is preferably a stand-alone unit, which allows existing switching devices to be retrofitted with an SCU. Moreover, the SCU can be applied to capacitors, reactors, transformers, and transmission lines to reduce system switching transients and extend interrupter life.

Synchronous Closing

For shunt capacitor banks and transmission lines, synchronous closing may be employed to close the circuit breaker interrupters precisely when the voltage across each interrupter is zero. This results in minimal energization transients. This is important because, e.g., voltage transients generated by capacitors and transmission lines can overstress system insulation. The high frequency, high magnitude inrush current transients during capacitor energization can also interact with and damage metering circuitry. Shunt capacitor bank energization has also become a growing concern for power quality, as more and more voltage sensitive customer loads are connected to utility systems. In addition to eliminating system transients, synchronous or zero voltage closing also virtually eliminates prestrike wear on the interrupter contacts. This can result in a significant reduction in contact and nozzle erosion for back-to-back switching applications.

For transformers and shunt reactors, synchronous closing may be employed to close the interrupters at a voltage peak, eliminating the high magnitude, heavily distorted inrush currents associated with iron core devices. These inrush currents can cause difficulties for system protection engineers and often require filtering of harmonic components or time delays in the protective relays. Peak voltage closing can eliminate offset flux conditions and result in a smooth transition to magnetizing current flow.

Synchronous Opening

For capacitive current switching, such as in connection with capacitor bank de-energization or unloaded line de-energization, restrikes in the circuit breaker may occur with a very low probability due to the relatively high peak of the transient recovery voltage (which has a 1-cosine waveshape). Because this transient recovery voltage appears with every de-energization, the low probabilities may become a concern, especially in large utilities where a large number of circuit breakers exist. Restrikes are typically undetected in the system because the circuit breaker typically clears any restrikes which occur. However, restrikes generate severe voltage transients that can damage system equipment and insulation. A method for greatly reducing the chance of restrike under these conditions involves maximizing the arcing time of the capacitive current during de-energization. The capacitive switching transient recovery voltage typically has a 1-cosine waveshape with a peak occurring one-half cycle after current interruption. By maximizing the arcing time, the interrupter gap at the point of the peak of the transient recovery voltage is significantly increased, having a much greater dielectric withstand capability. This greatly reduces the likelihood of a restrike. This feature is not necessarily intended to substitute for interrupter design requirements for meeting transient recovery voltage requirements without synchronization. Rather, it provides an added measure of security for the system and supplements synchronous closing for capacitors and transmission lines.

for transformers and shunt reactors, similar failures to withstand recovery voltage may occur. This problem usually is more pronounced for shunt reactor de-energization, where a high frequency, high magnitude transient recovery voltage may result in re-ignitions. Re-ignition transients are also dangerous for system equipment and insulation. Shunt reactor failure following re-ignition can occur; typically, great care is taken to design circuit breakers for shunt reactor switching. Synchronous opening greatly reduces the likelihood of re-ignition by maximizing arcing time, which in turn provides a larger interrupter gap with greater dielectric withstand capability when the reactor switching transient recovery voltage occurs.

Under fault conditions, the SCU 60 employs synchronous opening to minimize arcing time and reduce wear on the interrupters. This feature can significantly increase the maintenance intervals for the circuit breaker.

Operation of SCU

Referring now to FIG. 6A, the SCU 60 determines an electrical and mechanical system adaptation adjustment ($\Delta T_{Adapt}$) at block 610. In parallel with the process of block 610, the SCU at blocks 620 and 630 receives sensor inputs for temperature, control voltage, operating mechanism energy, and operating signal history, and then determines a compensation adjustment for operating time ($\Delta T_{Comp}$). In addition, the SCU at blocks 634 and 636 receives sensor inputs for system voltage and system current, and then determines system current and voltage targets for synchronous closing and opening. As shown in FIG. 6A, the processes for determining the target opening/closing times, adaptation adjustment, and compensation adjustment are performed in parallel.

At block 632, the SCU determines the estimated operating time of the circuit breaker. In presently preferred embodiments, the estimated operating time is given by, $$T_{Est}=T_{Base}+\Delta T_{Comp}+\Delta T_{Adapt},$$

where $T_{Base}$ is a baseline target switching (opening or closing) time.

At block 638, the SCU employs the estimated operating time of the circuit breaker and the target opening and closing current and voltage to calculate an operating time delay to close and open the circuit breaker at the target system voltage and current if an operating signal were received now. At decision block 640, the SCU determines whether an operating signal 642 has been received. When a close or open operating signal 642 is received, the SCU process proceeds to block 644. Otherwise, the process branches to blocks 610, 620, and 634, as shown.

At block 644, the SCU operates the circuit breaker with the calculated time delay. At block 646, the SCU calculates a performance error as, for example, $$T_{Error}=T_{Actual}-T_{Est}.$$

At block 648, a performance database (not shown) is updated and then the process branches back to blocks 610, 620, and 634.

FIG. 6B depicts in greater detail the process of block 630 for determining the compensation adjustment $\Delta T_{Comp}$. As shown, the process begins at block 631 as the SCU receives sensor inputs for temperature, control voltage, operating mechanism energy, and operating signal history. At block 632, the SCU determines compensation times for temperature, control voltage, mechanism energy, and history, respectively denoted $\Delta T_{Temp}$, $\Delta T_{Control\ Voltage}$, $\Delta T_{Mechanism\ Energy}$, and $\Delta T_{History}$. These compensation factors are preferably determined from factory-established or updated circuit breaker characteristics. For example, data may be stored in memory in the form of a table or may be computed. At block 633, the SCU analyzes the performance database to determine the statistical significance of any changes in compensation characteristics. At block 634, the SCU determines whether any statistically significant changes have occurred. If so, the compensation characteristic that significantly changed is updated and the process branches to block 632. If there were no significant changes, the SCU calculates the compensation adjustment as, $$\Delta T_{Comp}=\Delta T_{Temp}+\Delta T_{Control\ Voltage}+\Delta T_{Mechanism\ Energy}+\Delta T_{History}.$$

The compensation adjustment $\Delta T_{Comp}$ is then output to block 632 (FIG. 6A).

FIG. 6C depicts details of the process of block 610 (FIG. 6A) for determining the adaptation adjustment $\Delta T_{Adapt}$. As shown, the process begins at block 611, where the SCU performs a statistical analysis of performance data to define distribution parameters (e.g., mean and variance) for prescribed electrical and mechanical performance parameters. The data is normalized to remove compensation and feedback adjustments.

At block 612, the SCU determines whether the previous operations confirm any trends. If not, at block 613 the SCU determines whether the last performance error $T_{Error}$ was within acceptable bounds. If, at block 612, a trend is confirmed, at block 614 the SCU updates the adaptation parameter $\Delta T_{Adapt}$. If, at block 613, the SCU determines that $T_{Error}$ is within acceptable bounds, the SCU at block 615 calculates a new baseline target based on previous performance data. For example, a new baseline target is preferably calculated as $$T_{Base\ (New)}=T_{Base\ (Old)}+(T_{Actual}-T_{Predicted})/2.$$

This constitutes a feedback adjustment.

In sum, the present invention employs microprocessor-based devices (i.e., the CMU, BCU, and SCU) to enhance circuit breaker functionality. Moreover, the use of microprocessor-based devices physically located at the circuit breaker offers opportunities for reducing system transients, extending interrupter life, identifying impending failures, and identifying maintenance requirements as needed. The system provides remote communications capability, self-diagnostics, and simplified wiring to the circuit breaker through the use of fiber optic cabling. The present invention may be employed in association with the mechanical linkage for independent pole operation disclosed in U.S. patent application Ser. No. 08/196,590 (Attorney Docket No. B930330/ABHS002), filed Feb. 11, 1994, titled "Independent Pole Operation Linkage."

While the invention has been described and illustrated with reference to specific embodiments, those skilled in the art will recognize that modification and variations may be made without departing from the principles of the invention as described above and set forth in the following claims.

We claim:

1. A condition monitoring unit (CMU) for monitoring a switching device, comprising wear determination means for determining the wear condition of a component of the switching device, said wear determination means being operative to determine said wear condition on the basis of at least measurements of: (1) reaction time, defined as an elapsed time from initiation of a close signal for closing said switching device to a first signal generated by a sensing device indicating that said switching device has begun to close; (2) velocity of the switching device during free travel without the effect of contact make/break or damping; and (3) absolute travel of the switching device; and means for comparing the wear condition with a prescribed limit value.

2. A CMU as recited in claim 1, wherein said CMU further comprises means for determining the wear condition of a plurality of components or parts of components of the switching device.

3. A CMU as recited in claim 2, wherein the switching device comprises an interrupter and said CMU further comprises means for determining the wear condition of prescribed components or parts of components of the interrupter.

4. A CMU as recited in claim 3, wherein the interrupter components include arcing contacts, a main insulating nozzle, and an auxiliary nozzle.

5. A CMU as recited in claim 4, wherein said interrupter components each include specific points of wear and each of said specific points of wear wears (erodes, ablates, or abrades) at a different rate depending upon an imposed arcing current magnitude and duration.

6. A CMU as recited in claim 5, wherein the CMU further comprises means for carrying out a process specifically adapted to estimate the wear rate at each of said specific points of wear.

7. A CMU as recited in claim 6, wherein each process employed to estimate the wear at the wear points estimates the wear on the basis of a measured instantaneous current and a proportionality constant.

8. A CMU as recited in claim 7, wherein each of said processes for estimating wear is adapted for contact opening or closing.

9. A CMU as recited in claim 8, wherein the CMU further comprises means for determining the accumulated wear for each of said wear points, comparing the accumulated wears to known limit or "end-of-life" values, and signaling an alarm when an estimated wear reaches or exceeds its limit value.

10. A CMU as recited in claim 1, wherein said CMU comprises means for determining mechanical damping associated with a moving part of the switching device.

11. A CMU as recited in claim 10, wherein said moving part is a drive rod bearing a plurality of bars, and wherein the CMU employs an optical pick-up to determine the speed of the drive rod by counting the number of bars passing the optical pick-up.

12. A CMU as recited in claim 1, wherein the switching device comprises a hydraulic-spring operating mechanism, wherein a motor charges a spring by pressurizing a hydraulic fluid, and the CMU comprises means for monitoring the condition of the hydraulic-spring operating mechanism by monitoring (1) the number of motor starts per a prescribed unit of time and (2) the time required to pump-up the charging system.

13. A CMU as recited in claim 1, wherein the CMU comprises means for monitoring the condition of a heater and thermostat associated with the switching device.

14. A CMU as recited in claim 1, wherein the CMU comprises means for monitoring the condition of a trip and close coil associated with the switching device.

15. A CMU as recited in claim 1, wherein the CMU comprises means for monitoring the condition of an $SF_6$ gas system associated with the switching device.

16. A CMU as recited in claim 1, wherein the CMU comprises means for monitoring the condition of a relay control system associated with the switching device.

17. A method for monitoring the condition of a switching device, comprising the steps of determining the wear condition of a component of the switching device, the wear determination step determining said wear condition on the basis of at least measurements of: (1) reaction time, defined as an elapsed time from initiation of a close signal for closing said switching device to a first signal generated by a sensing device indicating that said switching device has begun to close; (2) velocity of the switching device during free travel without the effect of contact make/break or damping; and (3) absolute travel of the switching device; and comparing the wear condition with a prescribed limit value.

* * * * *